Sept. 3, 1929. R. J. KEAYS ET AL Re. 17,421

FILING DEVICE

Original Filed Sept. 9, 1926

INVENTOR.
ROBERT J. KEAYS.
EDWARD I. COFFEY.
BY Townsend, Lofton & Abbett
ATTORNEYS.

Reissued Sept. 3, 1929. Re. 17,421

UNITED STATES PATENT OFFICE.

ROBERT J. KEAYS AND EDWARD I. COFFEY, OF SAN FRANCISCO, CALIFORNIA.

FILING DEVICE.

Original No. 1,646,696, dated October 25, 1927, Serial No. 134,421, filed September 9, 1926. Application for reissue filed June 19, 1928. Serial No. 286,661.

This invention relates to filing devices for the reception, segregation or classification of letters, bills, prints, papers, documents, etc., in accordance with methods now largely employed in commercial establishments; the invention relating particularly to a filing clamp for the reception of papers segregated or otherwise which may be used in conjunction with standard filing systems such as filing cabinets, books, etc.

The object of the present invention is to generally improve and simplify the construction and operation of filing devices of the character described; to provide a filing device which may be readily detached or replaced in the filing cabinet or the like; to provide a filing device which is flat and elongated in shape and which requires comparatively little space, and further to provide a filing device in which the papers or other matter filed may be quickly removed or reinserted as the case may be.

Figure 1:
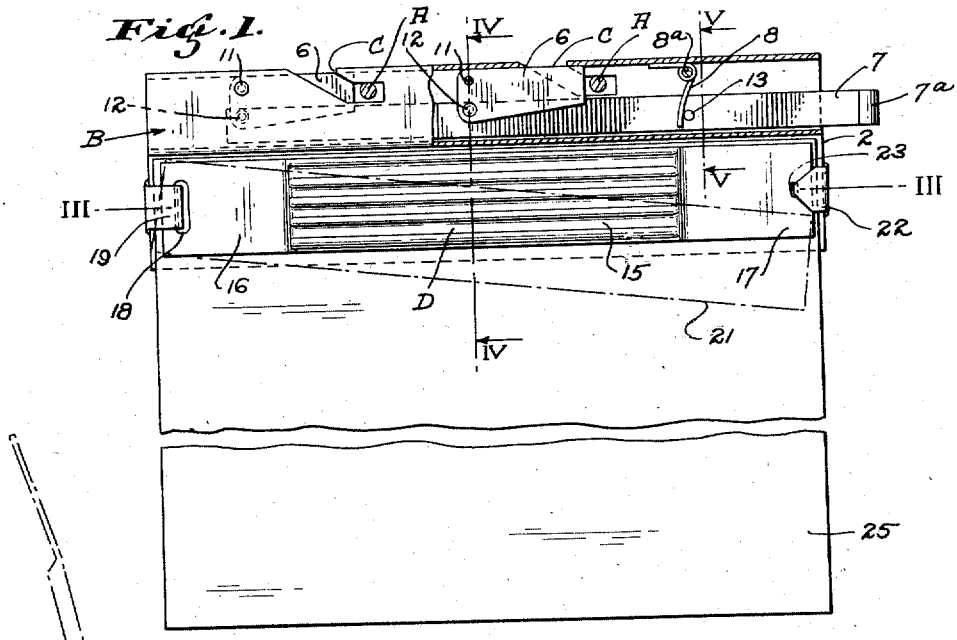
Figure 2:
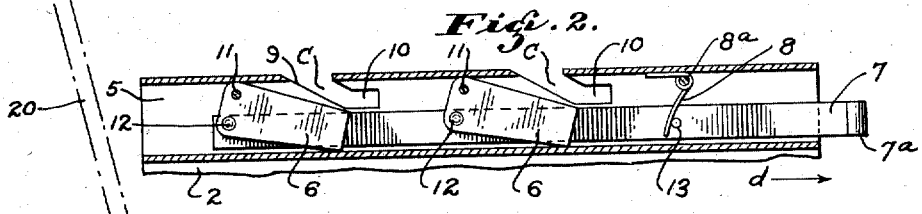
Figure 3:
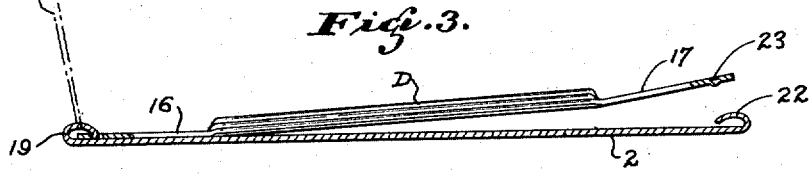
Figure 4:
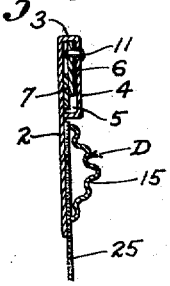
Figure 5:
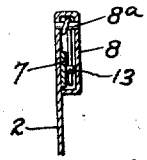

The invention is shown by way of illustration in the accompanying drawings, in which:

Figure 1 is a front view of the filing device, said view being partly broken away and partly in section, Figure 2 is a central vertical longitudinal section of the upper portion of the filing device, Figure 3 is a longitudinal section taken on the line III—III of Figure 1, Figure 4 is a cross-section taken on the line IV—IV of Figure 1, Figure 5 is a cross-section taken on the line V—V of Figure 1.

The filing device illustrated in this instance may be used in conjunction with a number of standard filing systems already in use, but it is essential that the cabinet, book, drawer, file or other container employed be provided with parallel posts, rods, wires or the like to receive and retain the filing device forming the subject matter of the present invention.

For purposes of description, let it be assumed that a filing cabinet is employed and that it is provided with two parallel rods in its upper portion which extend from the front to the rear thereof and that the filing device is suspended from said rods and is slidable from end to end thereof and further that the papers or other matter filed are, in turn, suspended from the filing device.

In the drawings A indicates the rods and B indicates, in general, the filing device. The filing device consists of a back plate 2 constructed of sheet-metal or the like which is bent at right-angles, as indicated at 3 and then downwardly across the front of the back plate, as indicated at 4. A space 5 is formed between the front plate 4 and the rear plate 2 and this space forms a housing for a pair of latches 6, an actuating bar 7 and a spring 8.

The upper edges of the plates 2 and 4 are recessed or notched as indicated at C. The upper portion of each notch is inclined as indicated at 9, the notch then being horizontally extended as at 10. The latches 6 normally assume the position shown in Figure 1 where they close the opening formed by the notches. They may be depressed, as shown in Figure 2, to open the notches so as to permit removal or replacement of the filing device on the rods A. The latches 6 are pivotally mounted as at 11 between the front and rear plates 2 and 4 and they are pivotally connected with the operating bar 7 through pins 12. The bar 7 itself is nothing more or less than a flat elongated strip of metal disposed between the front and rear plates and carrying a pin 13 which is engaged by the spring 8. This spring is nothing more or less than a piece of spring wire coiled about a pin $8^a$ and having its lower end engaging the pin 13 so as to exert pressure in the direction of arrow *d*.

The operating bar is freely slidable between the front and rear plates of the filing device and the tension of the spring 8 will, therefore, normally maintain the bar in the position shown in Figure 1 and the latches in their closed position. One end of the bar projects outwardly between the plates 2 and 4 into position to be engaged by the finger of an operator. A slight pressure on the projecting end $7^a$ of the bar forces it inwardly against the tension of the spring 8 and as it is pivotally connected with the latches 6, these will be swung about their pivots 11 so as to assume the depressed position shown in Figure 2, thereby leaving the notches open for removal of the filing device, with relation to the rods.

The part of the mechanism so far described is only for the purpose of attaching or removing the filing device with relation to the rods. The filing device is also provided with a clamp for securing papers or other matter to be filed and classified. The paper-securing means is an elongated spring clamping bar generally indicated at D. It is preferably constructed of spring steel, the center portion being longitudinally corrugated and also bowed upwardly transversely as shown at 15 to maintain that portion rigid and straight. The ends indicated at 16 and 17 are, however, flexible, and a bending or yielding movement is thereby obtained to permit a smaller or larger number of papers to be grasped and clamped thereby. One end of the clamping member by which the papers are secured to the back plate 2 is slotted as at 18 and a hinge is formed at this point by a bent lug 19 forming a part of the back plate.

The clamping plate D may be swung about the lug 19 as indicated by dotted lines at 20 in Figure 3 and it may also be swung downwardly on the lug 19, due to the size of the slot 18 as indicated by dotted lines at 21 (see Figure 1). The back plate 2 as already stated, is provided with one side lug 19 which is bent to form a hinge for the clamping plate and it is also provided with another side lug as indicated at 22 which is bent to form a retaining latch for the opposite end of the clamp. The cooperating end of the clamp D is slightly recessed as at 23 to maintain engagement with the latch or lug when the parts are in registry as in Figure 1.

In actual operation, if it is desired to attach a number of papers to the filing device, here shown, it is only necessary to apply pressure to the end 17 of the clamping bar D. This depresses the end 17 with relation to the retaining latch 22 and it may thus be swung downwardly to assume the dotted-line position shown at 22. From this position, it may be raised above the retaining latch 22 and swung back about the hinge or lug 19 as shown by dotted lines 20, in Figure 3. One or more papers, such as indicated at 25, may then be placed on the back plate, as shown in Figures 1 and 4 and these are secured by swinging the clamping plate D back against the plate 2 to assume the full-line position, as shown in Figure 3. The end 17 is then depressed and swung under the retaining latch 22. The spring action of the ends 16 and 17 causes the corrugated central portion 15 of the clamp to securely engage the papers and retain them against accidental removal. When the papers have been attached and it is desired to place the filing device in the cabinet, it is only necessary to bring the filing device or the notches C into registry with the rods A.

If a slight upward pressure is exerted on the filing device, at this point, the latches 6 are depressed and by forcing the filing device slightly sideways the rods A will enter the horizontal portions 10 of the notches and the latches will automatically spring back into place. On the other hand, if it is desired to remove the filing device together with the papers suspended therefrom or attached thereto, it is only necessary to apply slight pressure to the end 7ª of the operating bar. Such pressure causes the bar to move inwardly and the latches to assume the depressed position shown in Figure 2. In this position of the latches, the filing device is removed with relation to the rods and may then be taken out of the cabinet.

Either application or removal of the filing device is thus quickly and readily assured. A number of these filing devices may be placed on the rods A and proper segregation or classification for practically any matter to be filed, may be obtained.

While certain features of the present invention are more or less specifically described, we wish it understood that various changes may be resorted to from time to time within the scope of the appended claims. Similarly that the design and finish of the several parts employed may be such as the manufacturer may dictate or varying conditions or uses may demand.

Having thus described our invention, what we claim and desire to secure by Letters Patent is:—

1. A device of the character described, comprising a plate having a pair of notches formed in one edge, a pair of latches pivotally mounted on the plate, a sliding bar mounted on the plate, a connection between each latch and the bar whereby movement of the bar will swing the latches about their pivots into and out of registry with the notches, a spring engaging the bar and normally maintaining the latches in a position in registry with the notches to close the same, and a projection on the bar whereby it may be engaged and manually moved to swing the latches out of registry with the notches.

2. A device of the character described, comprising a plate having a pair of notches formed in one edge, a pair of latches pivotally mounted on the plate, means whereby the latches are yieldingly and normally held in a position to close the notches, and a paper clamping member on the plate.

3. A device of the character described comprising a plate having a notch formed in one edge thereof, a latch pivotally mounted on the plate, a sliding bar mounted on the plate, a connection between the latch and the bar whereby longitudinal movement of the bar will swing the latch about its pivot into and out of register with the notch, a spring engaging the bar and normally maintaining the latch in a position in register with the notch to close the same and a projection on the bar whereby it may be engaged and manually moved to swing the bar out of register with the notch.

ROBERT J. KEAYS.
EDWARD I. COFFEY.